(12) United States Patent
Whitman

(10) Patent No.: US 6,575,722 B1
(45) Date of Patent: Jun. 10, 2003

(54) APPARATUS FOR PRODUCING AND COOLING POLYMER PELLETS

(75) Inventor: Timothy W. Whitman, Hamilton, MA (US)

(73) Assignee: Beringer LLC, Marblehead, MA (US)

( * ) Notice: Subject to any disclaimer, the term of this patent is extended or adjusted under 35 U.S.C. 154(b) by 238 days.

(21) Appl. No.: 09/587,109

(22) Filed: Jun. 2, 2000

(51) Int. Cl.⁷ .................................................. B29B 9/06
(52) U.S. Cl. ......................... 425/68; 425/67; 425/311; 425/313
(58) Field of Search .......................... 425/6, 10, 310, 425/311, 313, 464, 67, 68

(56) References Cited

U.S. PATENT DOCUMENTS

| | | | |
|---|---|---|---|
| 2,086,888 A | 7/1937 | Zetzche et al. ................. 18/54 |
| 3,029,466 A | * 4/1962 | Guill ........................... 425/313 |
| 3,092,553 A | 6/1963 | Fisher et al. .................. 167/82 |
| 3,344,617 A | 10/1967 | Rinfret et al. ................ 62/322 |
| 3,368,366 A | 2/1968 | Keeling ........................ 62/374 |
| 3,447,337 A | 6/1969 | Skruch et al. ................. 62/318 |
| 3,664,354 A | 5/1972 | Minbiole, Jr. et al. ........ 134/61 |
| 4,032,271 A | 6/1977 | Gasior ......................... 425/10 |
| 4,149,837 A | 4/1979 | Baker et al. .................. 425/10 |
| 4,379,682 A | 4/1983 | Natale et al. ................. 425/10 |
| 4,461,636 A | 7/1984 | Gagneraude et al. ......... 65/141 |
| 4,526,731 A | 7/1985 | Henderson ..................... 264/5 |
| 4,663,093 A | 5/1987 | Haas et al. ................... 264/0.5 |
| 4,806,357 A | * 2/1989 | Garrett et al. ................ 427/4 |
| 5,215,763 A | 6/1993 | Mattera ....................... 425/311 |
| 5,518,677 A | * 5/1996 | Deaner et al. ............. 264/142 |
| 5,814,350 A | * 9/1998 | Rockstedt ..................... 425/67 |
| 6,143,221 A | * 11/2000 | Gurol ........................ 264/118 |

* cited by examiner

Primary Examiner—Robert Davis
Assistant Examiner—Joseph S. Del Sol
(74) Attorney, Agent, or Firm—Lahive & Cockfield, LLP

(57) ABSTRACT

An apparatus for producing and cooling polymer pellets. Hot pellets cut from a die plate extruder are impelled through air and quickly enveloped in a stream of cooling liquid. The stream is then directed to flow in a first horizontal and vertically descending path, and deflected and inverted into one or more succeeding horizontal and vertically descending paths forming a cascade array, until the pellets are cooled to a predetermined temperature.

3 Claims, 3 Drawing Sheets

APPARATUS FOR PRODUCING AND COOLING POLYMER PELLETS

BACKGROUND OF THE INVENTION

This invention relates generally to the production of pellets of uniform size from a body of hot flowable polymeric composition material, facilitating storage, packaging, transporting, weighing and other uses in the plastics industry. More particularly, the invention relates to a method and apparatus for cooling the pellets immediately after they are cut from the extruder to prevent adhesion between pellets, and undesired agglomeration.

The common practice is to extrude and cut the polymer into pellets when it is in a liquid state at an elevated temperature, referred to for brevity as a molten state. The pellets are then collected and cooled to a solid state by any one of a variety of methods and apparatus. Pelletizers such as that described in Mattera U.S. Pat. No. 5,215,763 comprise a number of rotating knives which cut strands of the polymer as they are extruded from a die face, impelling the hot pellets in air and into a cooling fluid, usually water. The water is arranged to flow over surfaces that surround the die knife area. If the pellets have a specific gravity greater than one they usually become enveloped by the water, and all surfaces are subjected to cooling at about the same time and at the same rate of cooling. Under properly adjusted conditions the pellets usually stay separated from one another and do not adhere together or agglomerate. However, in some cases there is a tendency for pellets to float in the water either because they have a specific gravity less than one, or because water vapor bubbles form locally and adhere to their surfaces. Pellets that float tend to be cooled only on the surfaces immersed in water, while other surfaces retain a higher temperature for a longer period of time. When such pellets become concentrated at the surface rather than being distributed throughout the water, agitation causes them to come into mutual contact and to adhere at surfaces that have not been sufficiently cooled. This leads to nonuniformity in the sizes of the resulting solids and consequent degradation of the product.

BRIEF SUMMARY OF THE INVENTION

The principal object of this invention is to provide a method and apparatus for producing polymer pellets which controls the flow of cooling fluid so that it arrests, envelopes and controls the movement of the pellets so that, whether having a specific gravity greater than or less than one, they are caused to be uniformly exposed to the cooling fluid on all surfaces thereof. Thereby, the uniform cooling of each pellet reduces the probability of sticking to another pellet as the polymer is being cooled down to the solid, nonsticking state.

With the foregoing object in view, this invention includes a method and apparatus whereby a pellet slurry, comprising a stream of cooling fluid and polymer pellets cut from a hot die face and quickly immersed therein, is quickly introduced into a series of sluices which cause the slurry to be repeatedly reversed in direction and simultaneously inverted, causing the floating pellets to be repeatedly moved toward the bottom of and fully immersed in the flowing fluid, thereby enveloping, cooling and buffering the whole periphery of each pellet with fluid.

The pellets are initially enveloped in the fluid in a suitable pellet forming apparatus, and the pellet laden slurry is discharged into a columnar collector. The pellet slurry falls in a free trajectory until it impacts the surface of a cascade array of baffles. Each baffle directs the stream to flow in a horizontal and vertically descending path. While flowing in such path, the lighter pellets begin to float and segregate at the top of the fluid stream. The stream is then deflected and inverted to reverse its horizontal direction, causing it to flow in another horizontal and vertically descending path. At each repeated inversion of the stream the portion of the slurry at the top of the stream, viewed in a vertical cross section, is reversed to the bottom. Thus the floating pellets are each repeatedly immersed in the fluid during the time period required for cooling to a desired temperature below which sticking and agglomeration do not occur. The floating and reimmersion continues through successive baffle reversals until the pellets are cool enough. The pellet slurry is then usually discharged from the columnar collector into a dryer.

DETAILED DESCRIPTION

Figure 1:
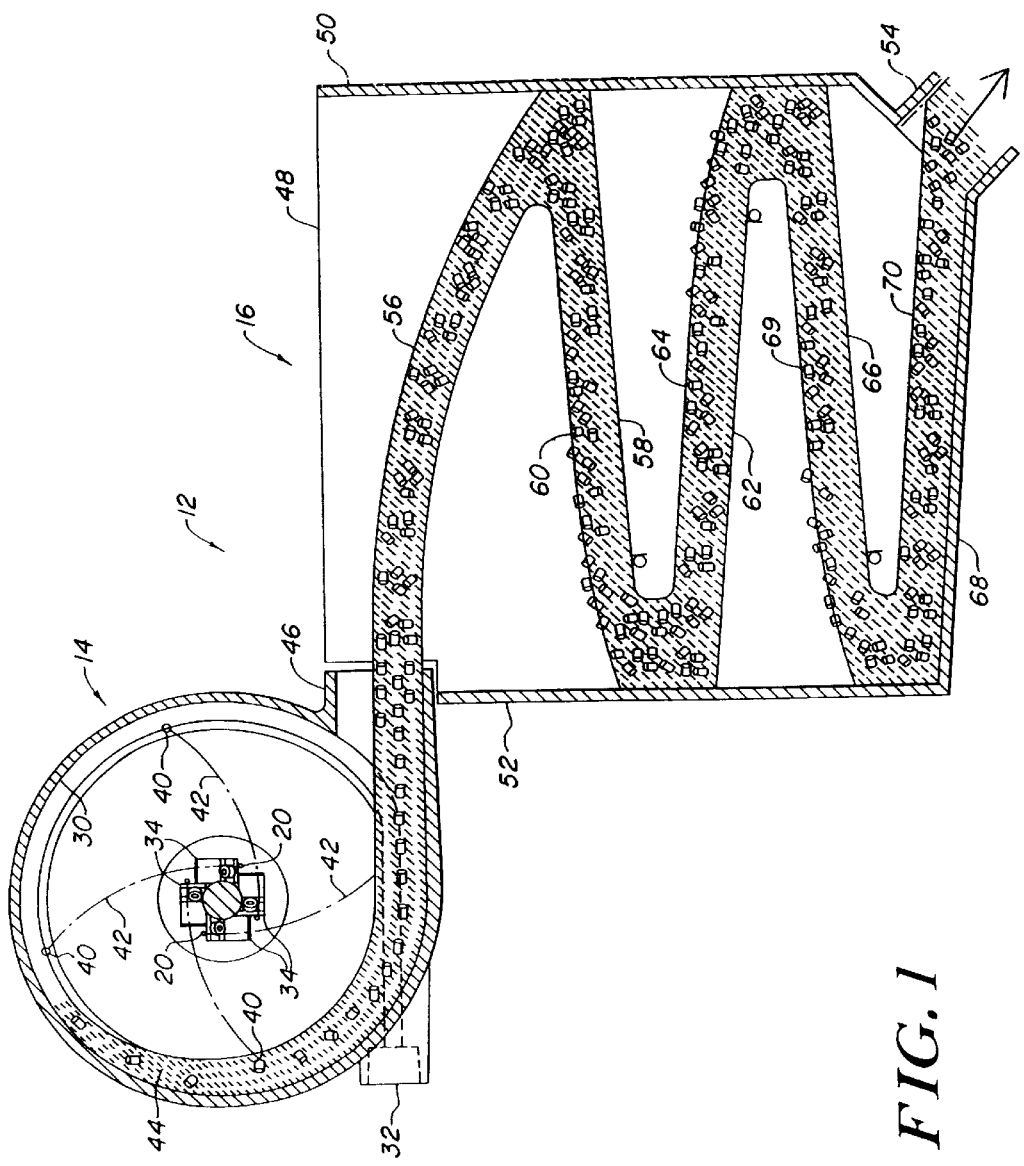
FIG. 1 is a partially schematic view of a pelletizer and associated cooling apparatus according to the invention.

The presently preferred embodiment of a polymer pelletizer according to the invention is designated generally at 12 in FIG. 1 and comprises a die plate and rotary knife extruder 14 and a columnar collector 16. The extruder may take any of the known forms adapted for cutting hot pellets and impelling them outwardly in air until they are arrested and entrained in a cooling fluid, for example water.

Figure 2:
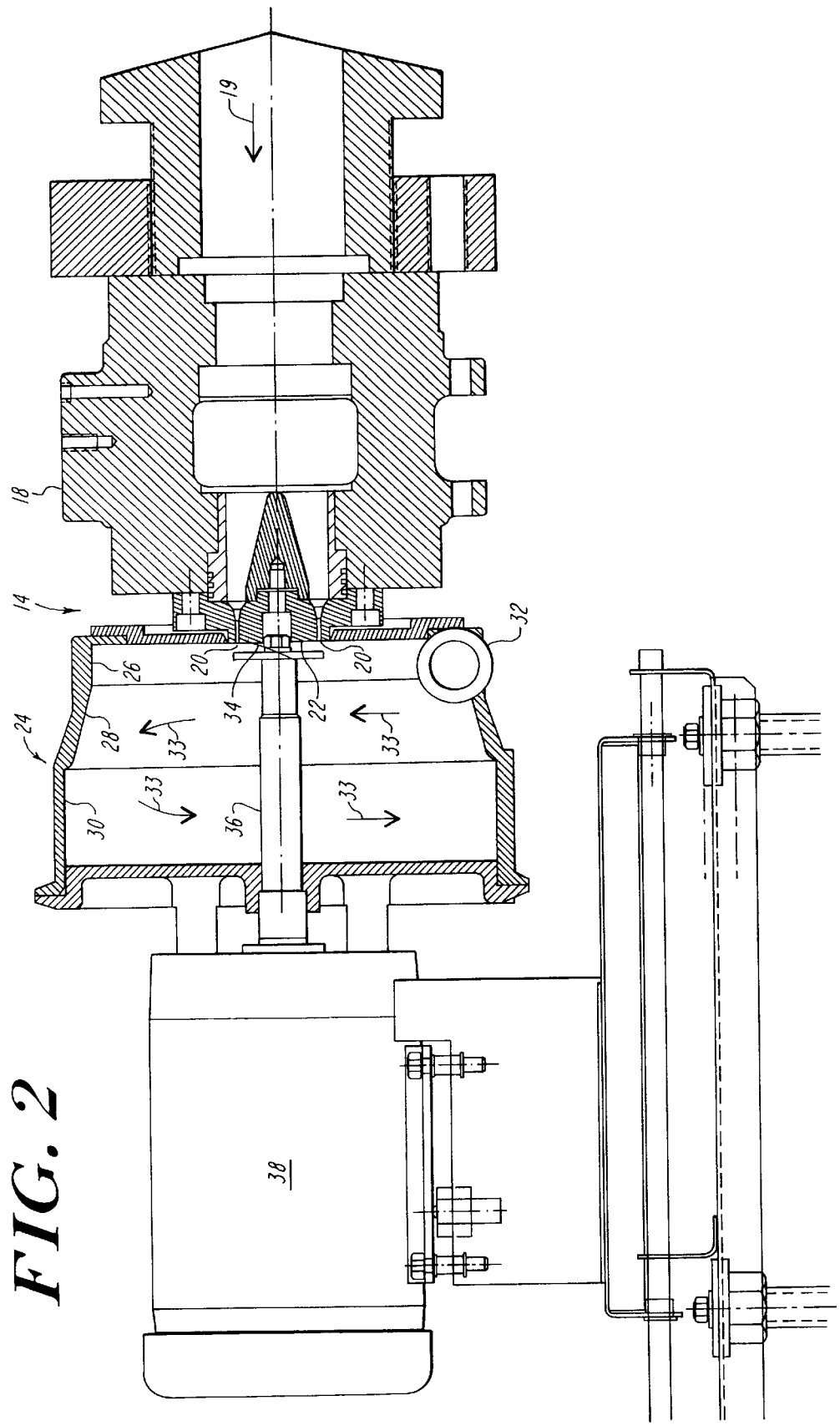
FIG. 2 is an elevation of the die plate and rotary knife pelletizer illustrating the formation of the pellets and the introduction of the cooling fluid stream.
Figure 3:
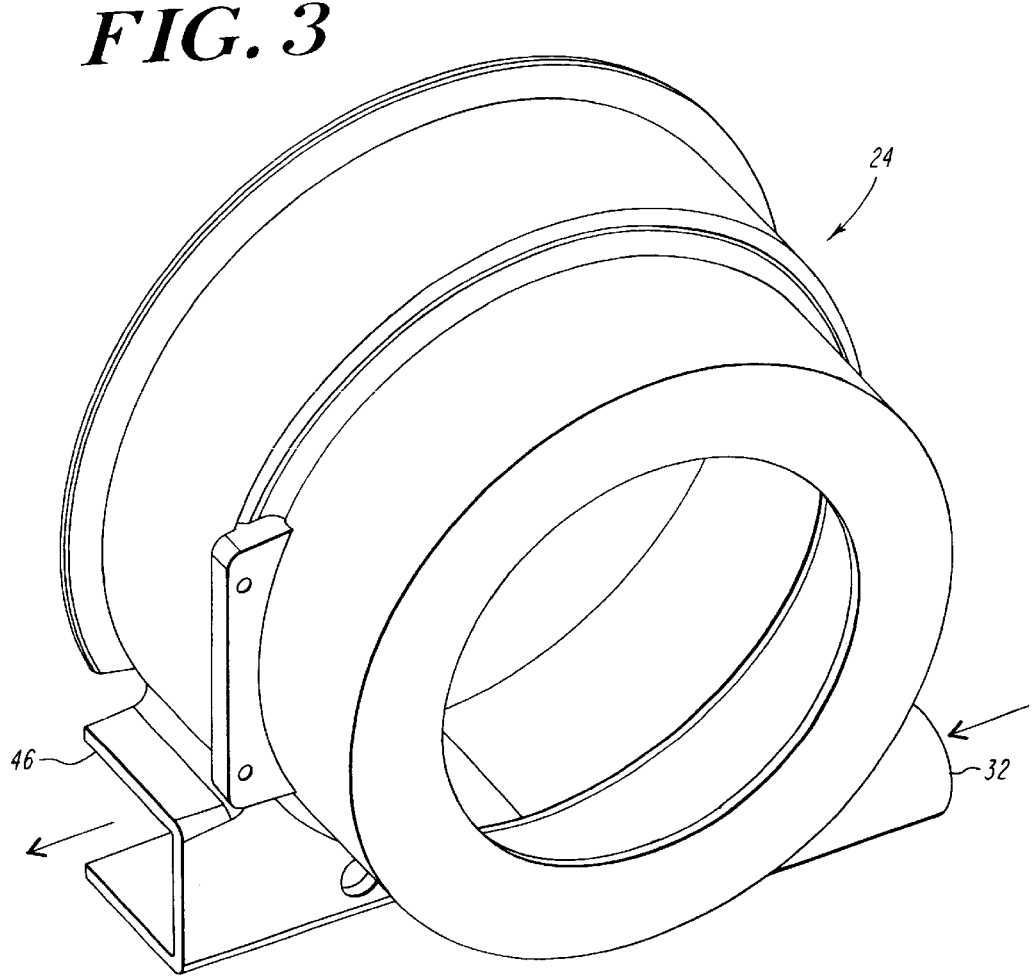
FIG. 3 is a fragmatic diagonal external view of the pelletizer head.

Referring to FIG. 2, the illustrated embodiment includes an extruder head 18 having means (not shown) to extrude molten polymer in the direction of an arrow 19 through a plurality of orifices 20 in a die plate 22. The orifices communicate with the interior of a pelletizer head 24. The head 24 is formed with interconnecting annular interior surfaces 26, 28 and 30 for controlling and directing a circular stream of cooling fluid projected into the head 24 through a fluid inlet 32. A source of cooling fluid under pressure (not shown) is connected to the inlet 32. The flow of fluid through the head 24 is illustrated by arrows 33 in FIG. 2 and by the arrows in FIG. 3.

A plurality of cutter knives 34 are supported on the shaft 36 of a motor 38, the shaft extending through a wall of the head 24 coaxially with the extruder 14. Hot pellets 40 (FIG. 1) are repeatedly cut at the die face and propelled in air over various short trajectories 42 until arrested and immersed in a stream 44 of the fluid. Preferably, the radius dimension of the head 24 is relatively small, thus reducing the length of the trajectories 42 and causing the pellets to be more quickly arrested by the stream.

The pellet laden slurry 44 is discharged from the pelletizer head 24 at an outlet 46. The outlet 46 is connected to the upper portion of the columnar collector 16 in the general form of a tank 48 having end walls 50 and 52, and an outlet 54. The force of the stream causes it to flow in a free trajectory and in a first horizontal and vertically descending path 56 until it strikes the wall 50 at the upper end of a first sluice or baffle 58 extending horizontally on a vertically descending path toward the wall 52. The wall 50 and baffle 58 are adapted to deflect and invert the stream, causing it to flow in a second horizontal and vertically descending path 60 toward the wall 52. A second sluice or baffle 62 is arranged in a manner similar to and beneath the baffle 58, combining with the wall 52 to deflect and invert the stream to reverse its horizontal direction and cause it to flow in a third horizontal and vertically descending path 64. A third sluice or baffle 66, arranged like the baffle 58, continues the cascade arrangement until the stream reaches the bottom 68 of the collector 16.

At each reversal and inversion of the stream, the lighter pellets that have begun to float to the top portion of the stream along each of the paths 60, 64, 69, 70 are caused to be inverted to the bottom of the stream, thereby becoming completely reimmersed and enveloped in the cooling fluid. The number of sluices or baffles and the height of the columnar collector may be designed for any desired number of reversals and inversions, as required for reducing the temperature of the pellets to a predetermined, non-sticking value.

The form of the sluices or baffles 58, 62, 66 may be chosen for convenience in fabricating the columnar collector 16 and controlling the flow pattern of the slurry. They may be substantially flat plate-like members supported between the walls 50 and 52, as shown, or they may be formed as open trays or troughs, the lower ends being spaced from the respective adjoining walls 50 and 52. Alternatively, the baffles may comprise fully enclosed circular pipes or tubular conductors of any desired cross section, with the flow inversions and reversals occurring within such pipes or conductors.

What is claimed is:

1. Apparatus for producing and cooling polymer pellets, including the combination of a die plate and rotary knife extruder for cutting hot pellets and impelling them outwardly in air, a pelletizer head formed to receive and direct a stream of cooling liquid to arrest and envelop the pellets, and a collector having means to receive the pellet-laden stream and a baffle to direct the stream in first and second consecutive horizontal and vertically descending paths and to allow the pellets to cool progressively along said paths, said second path being formed and arranged to invert the stream entering from said first path from top to bottom and to change its horizontal direction of flow, whereby the pellets at the uppermost level of the stream in said first path are inverted to the lowermost level of the stream upon entering said second path.

2. Apparatus according to claim 1, in which the baffle comprises a sloping trough and means to deflect the stream into an end thereof.

3. Apparatus according to claim 6, comprising a plurality of sloping troughs arranged to conduct the stream in a cascade of successive horizontal and vertically descending paths to a discharge end, and means to deflect and invert the stream from each trough to the next succeeding trough.

* * * * *